United States Patent Office 2,901,289
Patented Aug. 25, 1959

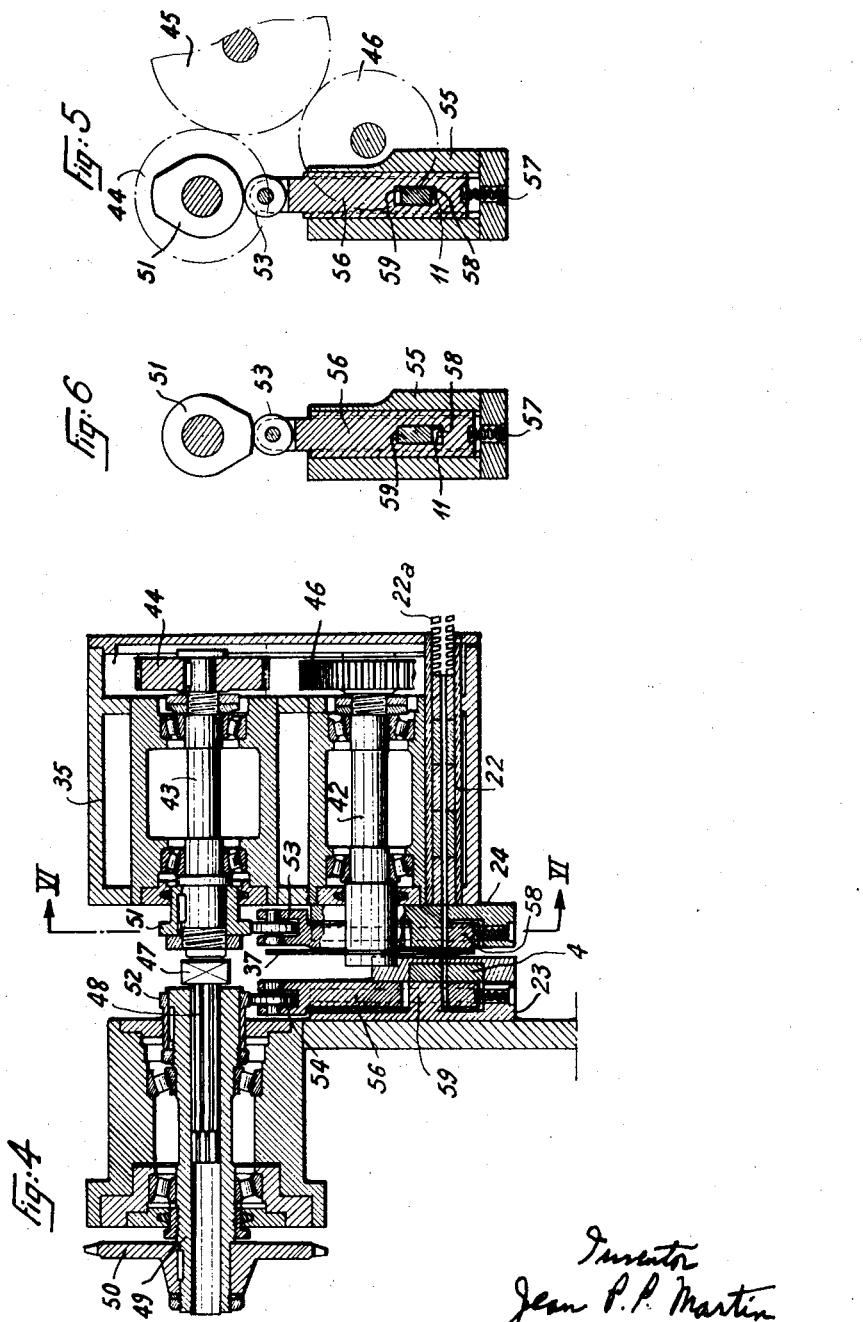

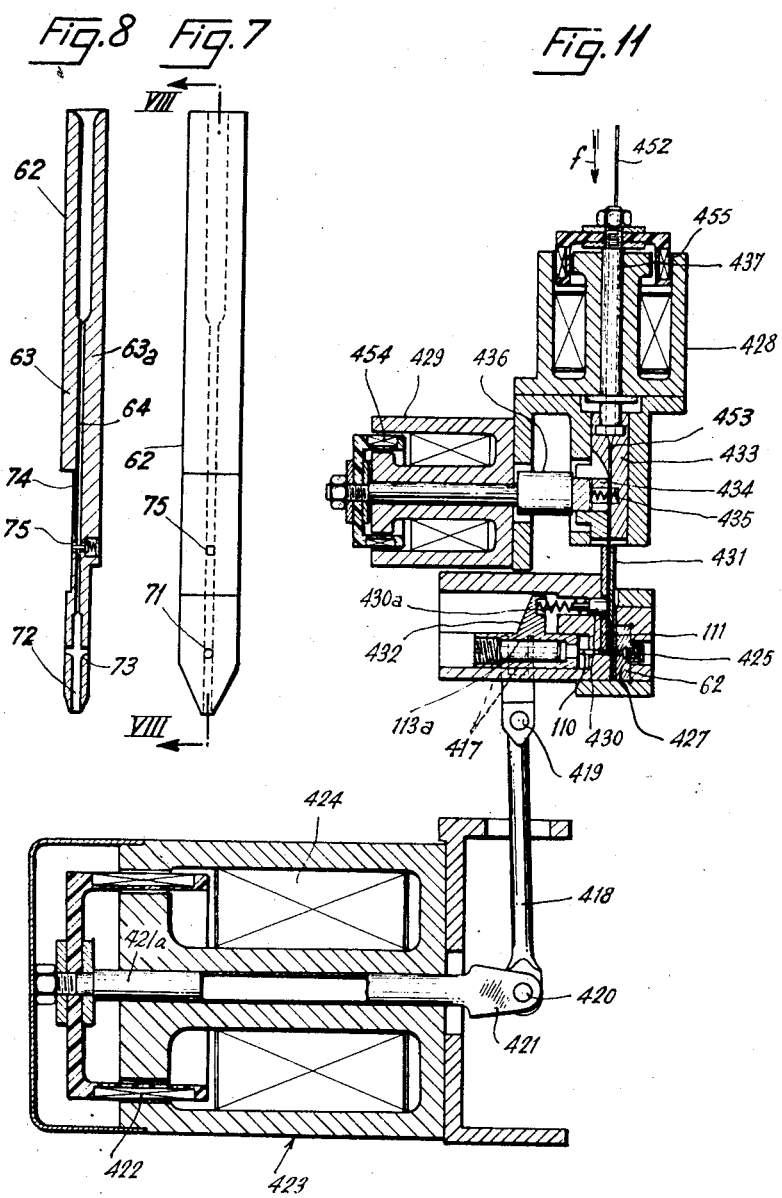

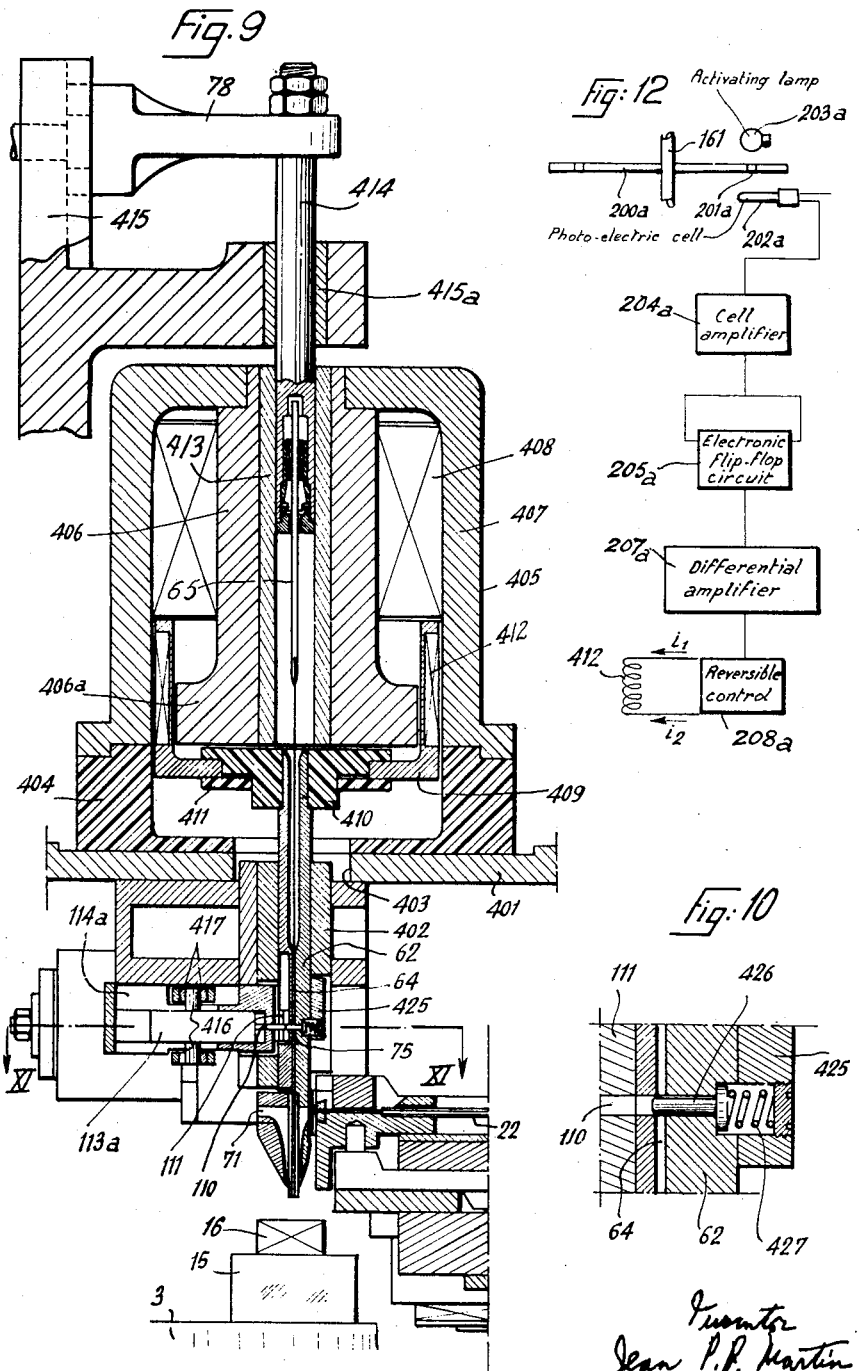

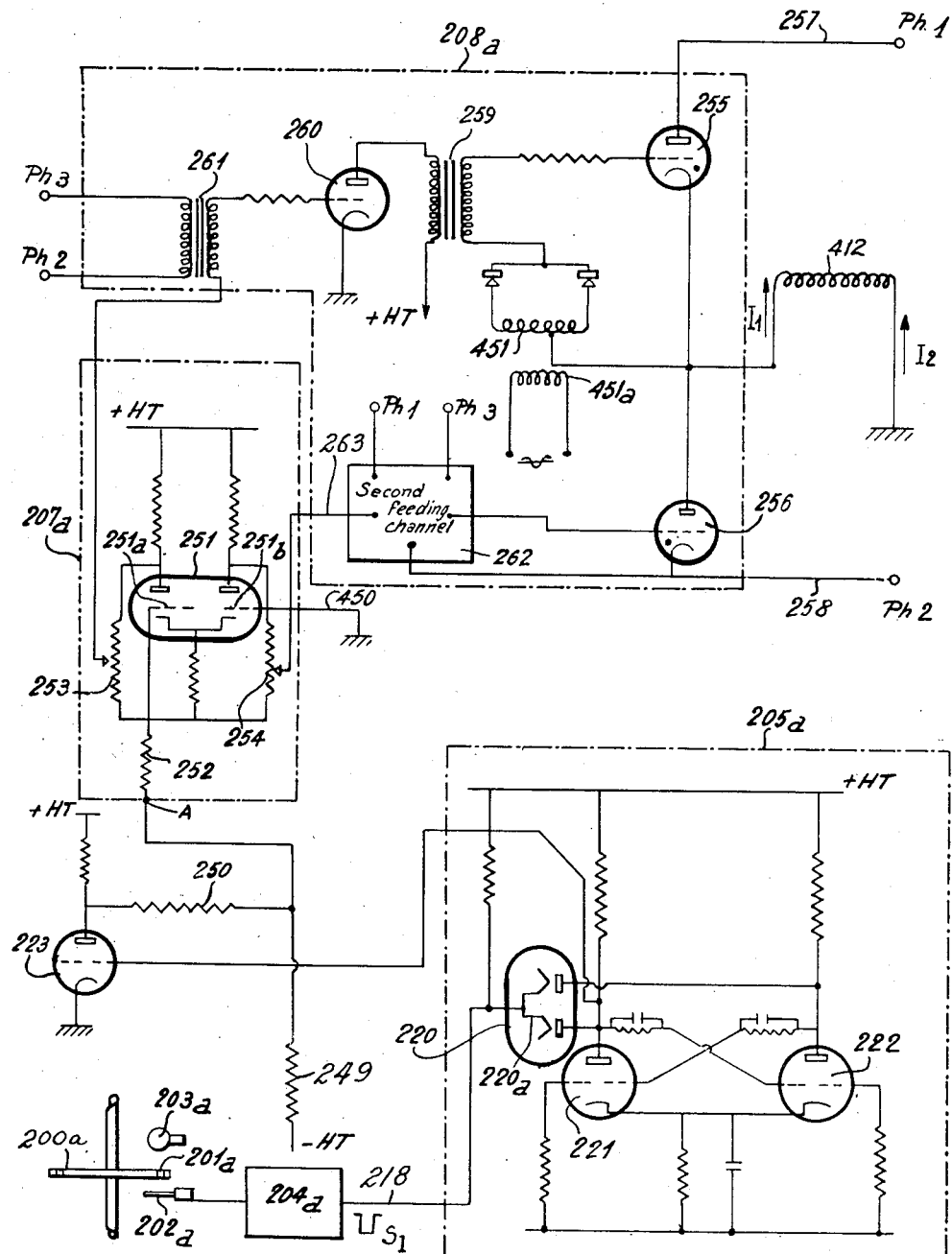
Aug. 25, 1959     J. P. P. MARTIN     2,901,289
AUTOMATIC MACHINE FOR THE MANUFACTURE OF BRUSHES
Filed Sept. 27, 1954     Fig. 13     7 Sheets-Sheet 6

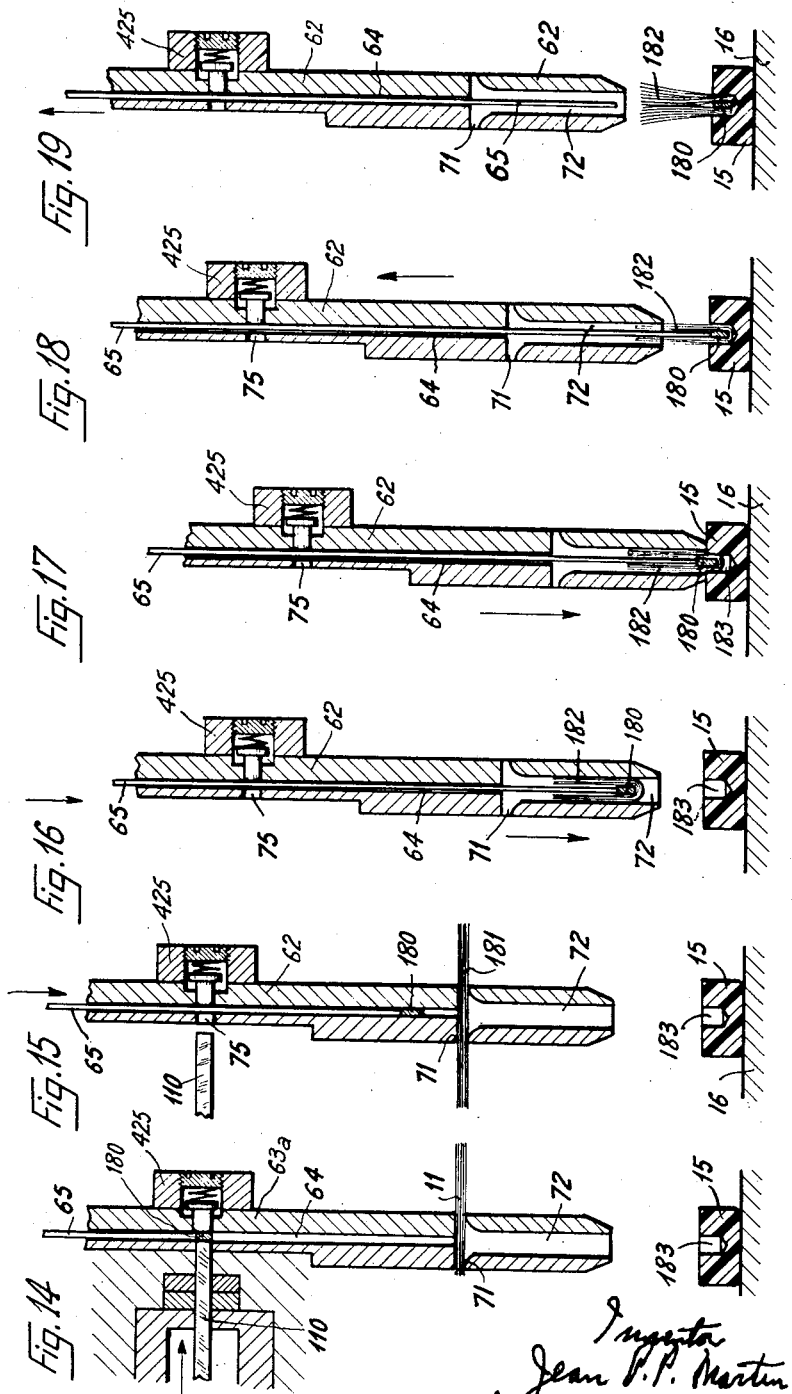

2,901,289

AUTOMATIC MACHINE FOR THE MANUFACTURE OF BRUSHES

Jean P. P. Martin, Beauvais, France, assignor to La Brosse & J. Dupont Reunis (Societe Anonyme), Paris, France, a company of France Application September 27, 1954, Serial No. 458,630

Claims priority, application France October 3, 1953

6 Claims. (Cl. 300—9)

The present invention relates to the manufacture of brushes and more particularly to a machine for making brushes from synthetic fibres fed to the machine in continuous lengths, and to the filling device necessary for the operation thereof.

One of the essential operations in the mechanical manufacture of brushes of all kinds is the formation of tufts of material for bristles, such as pig's hair, animal hair, synthetic fibre or natural vegetable fibre, followed by their insertion into holes previously formed in the heads of wood, bone or plastic, or other material. The devices performing these functions in brush-making machines are commonly known as filling devices.

In brush-making machines using known types of filling devices, the filling material, previously cut in bundles of lengths depending on the characteristics of the brush to be made, is placed in a container adjacent the machine, where it is taken by the tuft forming device for subsequent insertion in the holes previously formed for that purpose in the head of the brush.

The machine of the present invention uses a continuous layer of several non-twisted strands rolled in coils. The use of a continuous layer, which could not be contemplated as long as only natural fibres were employed, such as animal and certain natural vegetable fibres such as dog grass, tampico, coconut fibre, piassava, etc., has been made possible by the use in the brush-making art, in the last few years, of synthetic threads of polyamides, polystyrene, polyvinyl chloride or of any other suitable chemical material.

The use of a layer of continuous fibres for making the tufts not only enables dispensing with the previous cutting operation of the filling material into small bundles of a predetermined length, but in addition, it prevents raw material from being lost owing to errors in cutting.

Finally, the various tufts are all made up of the same predetermined number of fibres, which ensures that the tufts are perfectly regular and uniform, whereas this condition could not be strictly adhered to when the filling material was used in bundles.

It is possible to consider that the feeding device through which the continuous layer passes, will cut the tufts to the same adjustable length determined by the type of brush being manufactured, but in accordance with an important feature of one arrangement provided by my invention, this feeding device automatically cuts the tufts to lengths varying with their position on the head, and which are thus a function of the cross-sectional shape of the brush. This special feature enables a new and considerable economy to be effected in material as compared with the standard methods, whenever the profile of the brushing surface is not parallel to the filling surface of the brush head, since, in the known method, the bundles are cut to a length sufficient to provide the longest tufts required.

A machine in accordance with the invention is adapted to work at high speed, using the manufacturing method known as the flat strip method, i.e. using for retaining the tufts in the holes provided in the head flat metal strips force fitted into the holes above the hanks of bristles folded in two to form the tufts. In this machine, the flat strips are cut out of a strip of suitable metal by means of a punch and the hanks may be cut to the required length from a continuous layer of strands of filling material. These hanks are first of all engaged in the moving part of the filling device which receives a flat strip cut by the punch, the whole being force fitted by means of another moving member, known as a tongue, into a hole which has previously been formed in the head of the brush to receive a tuft.

The various parts of the machine have been designed so as to obviate all possibility of bouncing, which would be likely to prevent satisfactory fixation of the flat strips. Bouncing effects which may occur in the mobile work-carriers, and in particular in the work-carriers mounted on springs such as those provided in the usual machines for making brushes by the flat-strip method, are eliminated, due to the fact that the used work-carriers are of a rigid type, and are secured on the brush-carrier trolley, this arrangement enabling, furthermore, an easier positioning of the brush-heads to be effected.

In view of enabling a complete insertion of the tuft in the hole of the brush-head to be performed, a special feature of the filling mechanism of my invention provides for the nose of the filling device to be moved away and thus to release the filling material before the complete insertion of the tuft in the hole by means of the flat strip.

In accordance with a further special feature of the invention, the driving mechanism of the punch which cuts the flat strips from a strip of metal, is arranged so as to provide a stopping stage for the punch at the end of its forward travel, the punch being used as a pressure plate retaining the flat strip in the transfer channel of the filling device prior to the strip being pushed forward by the tongue.

According to a further special feature of my invention the filling device comprises a moving portion operated by a mechanism for the reciprocation thereof and arranged in such a manner as to cause two stopping stages of this moving part during each cycle, one of them enabling the hank of fibres and the flat strip to be introduced into the appropriate channels of this moving part and the other enabling said hank to be partly transferred as a tuft into the hole to be filled, a filling tongue which pushes the flat strip into the moving portion so as to insert it into the hole of the brush-head after the tuft has been pushed in, the driving mechanism of the tongue being such that this tongue reaches its lower dead centre only when the moving portion has begun its return movement, and a punch for cutting out the flat strip from a strip of metal and pushing it, while at the same time retaining it, in the filling channel of the moving portion wherein the tongue is adapted to move, the driving mechanism of this punch being arranged in such a way as to give the latter a dead period at the end of its forward travel during which dead period, the flat strip is held stationary, pending the thrust of the tongue.

In the machine in accordance with the invention, the moving part of the filling device is actuated by electro-dynamic means which are controlled by electronic means, and this enables a particularly rapid response of the controlled member to be obtained and provides a greater latitude in the timing of the rest periods and the operative stages of the moving parts.

In the preferred embodiment of my invention the moving portion of the filling device, the punch for cutting the flat strips and the feed arrangement of the metal strip from which said flat strips are cut, are actuated by electro-dynamic means, each providing an annular radial magnetic field in which a moving coil can shift longitudinally, the coil being supplied by direct current and the arrangement being such that the reversal of the direction of the current in each moving coil causes the latter to move in one or the other direction up to its travel end. This reversal may be advantageously effected by electronic means controlled optically from the main shaft of the machine.

The continuous layer of filling fibres is introduced into the channel of the moving portion of the filling device, during one of the rest periods thereof, by means of a feeding head comprising a drum around which the layer is wound in one complete turn, while being stretched under constant tension, and two gripping jaws by means of which the layer is locked while a hank of fibre is being cut to length; the length of the hank being automatically determined by the shape of the brush through a control device acting on the driving motor of the drum, and the position of the feeding head which carries the knife for cutting the hanks being brought under control according to the length of the hanks in such a way that the latter are suitably located with respect to the fixed filling device for their correct insertion in the hole of the brush-head.

The feeding head is mounted to be able to move in a direction parallel to that of the feeding channel for the filling material in the filling device, so as to allow the length of the tufts to be altered.

According to my invention, a machine for filling brushes with artificial bristles and with metal bristle anchoring inserts severed from a layer of continuous fibres and from a metal strip respectively when a moving portion of the filling device, having a mechanically operated tongue mounted for reciprocation in a longitudinal passage thereof, is in its retracted position, is characterized in that said moving portion of the filling device is provided with a first hole transversely located in open communication with said passage, said moving portion of the filling device when in its retracted position cooperating by means of said first hole with a feeding member for axially feeding the layer of fibres in said hole and with a severing device for severing a tuft of bristles from said layer, a second hole located above said first hole being provided from said passage in said moving portion of the filling device and opening on to a lateral face thereof, said moving portion in its retracted position cooperating by means of said second hole with a severing and feeding device for severing from said metal strip a metal insert and feeding it into said longitudinal passage, and in that said moving portion of said filling device is secured to an electronically controlled electro-dynamic device, arranged and adapted to move said moving portion to said retracted position in which both said holes are in register with the severing and feeding devices of the fibres and of the metal inserts respectively, and to an operating position in which the severed tuft of bristles and the metal insert are brought adjacent a brush-head and are forced by means of the mechanically operated tongue into a hole of said brush head, the motion from any one position to the other being effected rapidly and, in either case, initiated by means of an electric pulse.

The invention is illustrated by way of example in the accompanying drawings in which:

Fig. 4 is a horizontal cross-sectional view taken through the feeding channel of the operating mechanism for the clamping jaws and for the cutting means of the layer of fibres.

Figs. 5 and 6 show in cross-section through the line VI—VI of Fig. 4 one of the clamping jaws for the layer of material and its control cam in the positions corresponding to the gripping of the material and to its free passage, respectively.

Fig. 7 is an elevation and Fig. 8 is a vertical cross-section through the line VIII—VIII of Fig. 7, of the moving portion of the filling device.

Fig. 9 is a vertical cross-section taken through the axis of the filling device, in the preferred form of construction of the machine, showing the electro-dynamic operating device for the moving portion mounted above the table, and the arrangement of the punch for cutting the thin strips of metal.

Fig. 10 shows a detail of Fig. 9 on a larger scale.

Fig. 11 is a horizontal cross-sectional view taken along the line XI—XI of Fig. 9, showing the operating members of the punch and of the feeding device for the metal strip.

Fig. 12 is a simplified diagram showing the method of supplying the moving coil and a reversing device of the direction of the supply current from the main shaft of the machine.

Fig. 13 is a diagram of the D.C. supply circuit for the moving coils and for the reversal of the direction of this current.

Fig. 14 to 19 are diagrammatic cross-sections showing the operation of the filling device, the moving portion and the tongue being shown in various positions during the placing in position of a tuft.

Figure 1:
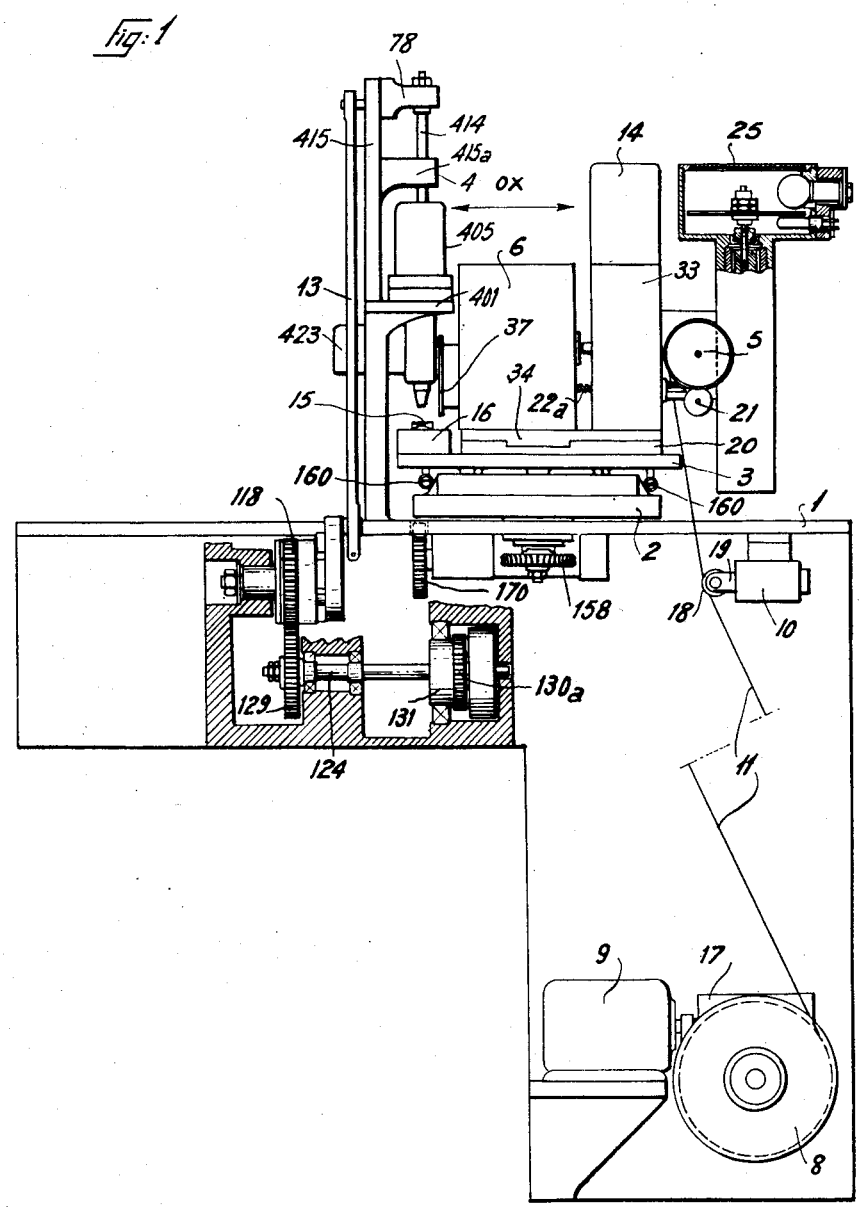
Fig. 1 is a somewhat diagrammatic elevational view of the machine, some of the parts being shown in section.

The machine generally shown in Fig. 1, comprises a frame consisting of a table 1 provided with openings for the passage therethrough of the operating members for two trolleys 2 and 3 adapted to move in two directions at right angles to each other, and parallel to the table supporting the filling mechanism 4, the feeding head, including a feed drum 5 for the layer of filling material, and a device 6 for regulating the length of the hanks with its driving motor 14, the device for feeding the strip of metal and the mechanism 423 for cutting the small metal strips from this continuous strip. Below the table 1, there are provided the drum 8 for the filling material and its driving motor 9, the tensioning device 10 which keeps the continuous layer 11 of filling material under a constant tension, and the controls for the trolleys 2 and 3 and for the connecting rod 13 driving the insertion tongue.

The brush head 15, provided with holes to be filled with material, is held in a suitable work-carrier 16 of a fixed type known per se, directly mounted on the upper trolley 3 and also directly located below the filling mechanism 4. The movement of the trolleys 2 and 3 can be controlled by cams in the usual manner.

The layer 11 of filling material is constituted by a plurality of identical synthetic monofilaments wound parallel to each other and without being twisted, on the drum 8. In view of the considerable size which the drum 8 must have so as to avoid too frequent replacements due to the high speed of operation of the machine, which can fill up to 1,000 tufts per minute, it is necessary to control the rotation of the drum 8 in order to ensure regular unwinding of the layer 11 of filling material. This rotation at suitable speed is effected by the motor 9 and the speed-reduction gear consisting of a worm and worm wheel assembly 17.

The layer 11 of filling material passes directly to the feeding head which is movably mounted on the table 1, by means of a cradle 20, on which it slides, and by means of bolts (not shown). This assembly enables the feeding head of the machine to be easily removed, either for its inspection and cleaning, or in order to replace it by another mechanism operating with bundles of natural fibre, in accordance with the known technique.

Figure 2:
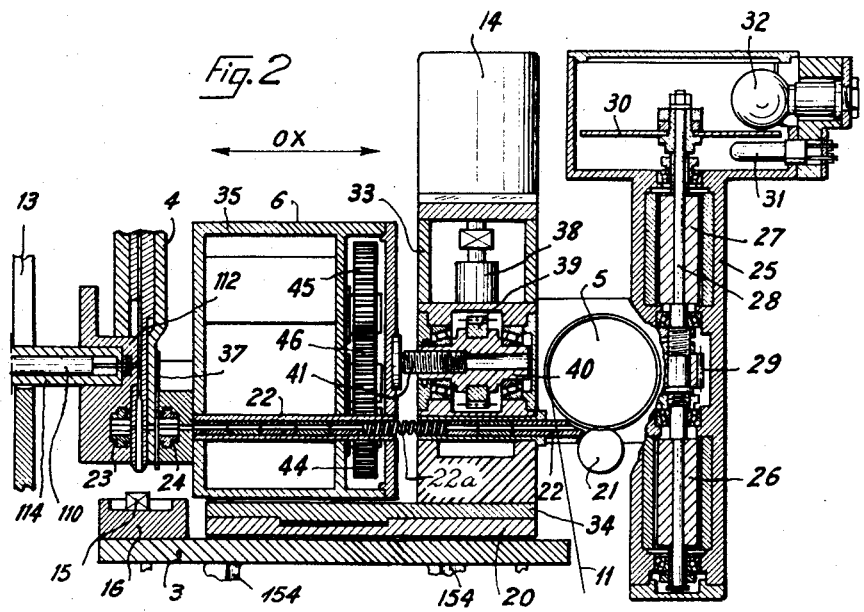
Fig. 2 is a vertical cross-sectional view of the feeding head assembly.

The injection or feeding head shown in Fig. 2, essentially comprises the feeding drum 5, around which the layer 11 forms one turn and against which it is continuously applied by means of a pressure roller 21, a feeding channel 22, two jaws 23 and 24, respectively fixed and movable, located on opposite sides of the filling device 4, the mechanism 6 for cutting the hanks, the mechanism for regulating the length of these hanks with its driving motor 14, and the mechanism 25 for driving and controlling the rotation of the feeding drum 5.

The latter comprises two identical electric motors 26 and 27 mounted on a common shaft 28 in the centre of which is keyed a worm 29 meshing with a worm wheel solid with the feed drum 5. The division of the feed motor in two small motors is made with the object of obtaining the necessary torque to feed the layer of material into the filling device, while at the same time reducing to a minimum the inertia of the rotating system. This enables quick starting and sudden stops to be effected and thus a high rate of operation of the machine. The rotation of the motors 26 and 27 is electronically controlled by conventional means, not requiring here a detailed description, comprising a disc 30 having holes arranged along a common circle and rotating between a photo-electric cell and an activating lamp 32. The electrical impulses which are produced when a hole in the disc 30 is passed between the lamp and the cell can be fed for example to an electronic cumulative counter being part of the aforementioned control device.

Figure 3:
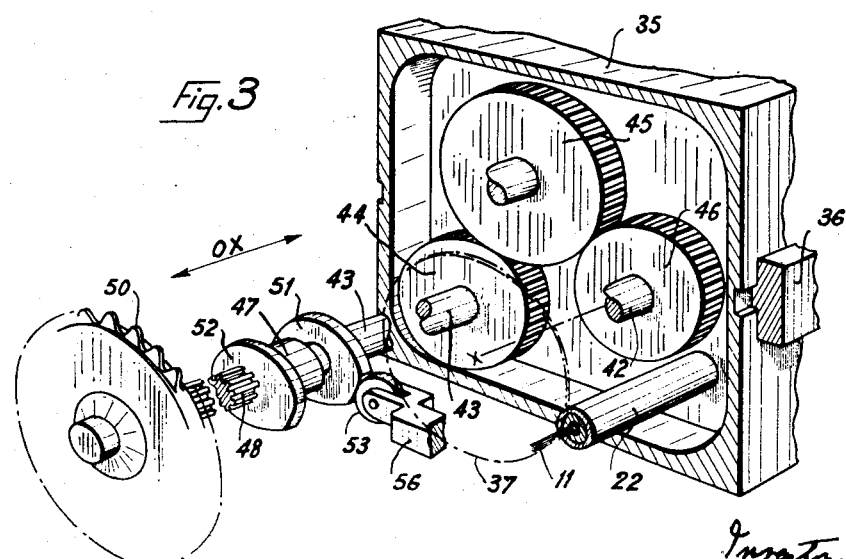
Fig. 3 is a view in perspective of the driving mechanism of the cams controlling the clamping jaws and of the cutting knife for the layer of filling material, the casing of the feeding head being broken away.

The assembly formed by the drum 5 and its driving mechanism 25 is rigidly secured to a casing 33 which is in turn secured to the base 34 of the feeding head, which slides on the cradle 20. This casing contains the driving members which effect the movement in the direction OX of the moving portion of the mechanism 6 which cuts the hanks, when their length varies. This moving portion comprises a casing 35 (see Fig. 3) sliding in the direction OX on slides 36 secured to the casing 33, the casing 35 carrying at its front portion (to the left in Figs. 2 and 3), the moving jaws 24 and the rotary cutting knife 37 for the hanks, which is supported on the front face of the jaws 24. Through the casing 35, as well, as through the casing 33, extends the feeding channel 22 which starts tangentially of the drum 5 and which includes, between the casing 35 and the casing 33, a resilient portion 22a capable of being stretched so as to make possible the displacements of the casing 35. These displacements are produced by the electric motor 14 operated in response to any control means, for example a cam follower cooperating with a cam turning step by step, and effecting one revolution for every complete brush filling, as is known in the art.

The arrangement is such that displacement of the casing 35 ensures the centering of the hanks under the filling device, irrespective of the lengths of the said hanks.

The motor 14 drives a speed-reduction gear comprising a worm and a worm wheel 38, 39, said wheel 39 being keyed on a nut 40 rotatably-mounted in the casing 33, and co-operating with a screw 41 secured on the rear face of the casing 35 (on the right hand in Fig. 2). Rotation of the motor 14 in either direction, thus causes a displacement in the direction OX parallel to the feed channel 22 of the casing 35 and the members carried thereby.

The casing 35, as has been previously stated, serves as a support for the moving clamping jaw 24, for the layer 11 and for the rotary knife 37 which cuts this layer. This knife is mounted at the end of a shaft 42 (see Fig. 3) supported in the casing 35 by means of two suitable bearings, and which has movement imparted thereto by a parallel shaft 43 through a train of gears 44, 45 and 46. The shaft 43 carries at its extremity on the outside of the casing 35 and nearest to the filling head (to the left in Figs. 3 and 4) a coupling joint 47 by means of which it is coupled to an outwardly splined shaft-end 48. This latter shaft slides in a sleeve 49 rotating in suitable bearings carried by the frame of the machine. The sleeve 49 is provided at its extremity opposite to the shaft 43 with a sprocket wheel 50 which is rotated by the main motor of the machine. At their adjacent ends, the shafts 43 and 48 are provided respectively with two cams 51 and 52 co-operating with two rollers 53 and 54 rotatably secured on the moving portions of the clamping jaws 23 and 24 for the layer 11 of material, which will now be described.

Each of these jaws, which are identical, comprises a fixed cage 55 (see Figs. 5 and 6), in which runs a slide 56 urged by a spring 57 in the direction of the operating cam 51 or 52, the roller 53 or 54 being carried by the end of the said slide opposite to the spring 57. The slide 56 is provided with a transverse opening 58 through which passes a small metal strip 59 fixed to the cage 55, sufficient clearance being provided in the axial direction of the slide to enable the latter to move. The bundle formed by the strands of the layer 11 held closely together in the feed channel 22 and extending to the jaws 24 carried on the casing 35, passes under the small flat strip 59 forming the fixed member of the jaws and it is thus tightly held between the strip 59 and the bottom of the opening 58 of the slide 56 (see Fig. 5) when the slide 56 is normally urged by the spring 57; it is on the contrary free when the boss on the cam 51 or 52 pushes back the slide inside of the cage 55 (Fig. 6). The opening of the two sets of jaws occurs simultaneously just before the feed of a length of the layer 11 corresponding to a hank, which is cut from the layer by the rotating knife 37 keyed on the shaft 42, when the two sets of jaws have again been closed.

Between the jaws 23 and 24, which are in accurate alignment in a horizontal plane, the filling device proper is adapted to move, passing rapidly from a retracted position in which the injection of a hank and the introduction of a metal insert strip takes place, to an operating position for the insertion of a tuft in a hole of the brush head. The filling device comprises, as in the known types of brush-making machines using thin metallic strips, two main portions having separate and distinct movements imparted thereto. The portion which receives the hanks and forms the delivery channel for the tufts will be thereafter referred to as, "the moving portion," while the member serving to push the tuft and its metal securing strip into the hole of the brush-head, will be known as the "tongue." The moving portion 62 of the filling device is formed by two members 63 and 63a (see Figs. 7 and 8) assembled one on the other in any suitable manner and providing between them a channel 64 in which slides the tongue 65 (Fig. 9). The two members 63 and 63a have formed therein a hole 71, the holes being arranged opposite each other at right angles to the axis of the channel 64 and coaxial with the feed channel 22 in the upper position of the moving portion 62. The hole 71 communicates by the intermediate portion thereof with a cylindrical hole 72 provided at the lower end of the moving portion for the passage of a folded hank and the intersections of the holes 71 and 72 are rounded off so as to facilitate the folding of the hanks.

The member 63 is thinned down at 74 so as to enable the nose of the punch which cuts off the thin metal insert which will be described later, to come as close as possible to the channel 64, in which the thin metal strip is to be introduced. In order to effect this insertion, the member 63 has formed in its thin portion 74 a rectangular hole 75.

It will be noted that the gap which exists in the known types of filling devices in order to feed laterally the filling material, has been eliminated in the filling device which has just been described, the feeding of the continuous material being carried out endways and at right angles to the lateral face of the member 63a through the hole 71.

In the preferred construction of the machine (Figs. 1 and 9), the moving portion 62 of the filling device is mounted vertically above the trolley 3 which carries the brush head 15, and is adapted to move in a slide 402 secured by any suitable means to the frame of the machine. This frame comprises a cross-bar 401 mounted above the table, the cross-bar being provided with an orifice 403 through which pass the moving portion 62 and the upper end of the slide 402. On this cross-bar 401, there is mounted, through the intermediary of a non-magnetic member 404, an electro-dynamic device 405 which operates the moving portion 62 of the filling device. This unit 405 comprises a hollow shaft 406 of soft iron fixed at its upper end by means of a magnetic joint to the centre of a body 407 of iron or mild steel and having the shape of a bell, in such a way that the geometric axes of the shaft 406 and of the body 407 coincide. The lower part 406a of the hollow shaft is radially flared outwards, so as to form with the internal wall of the body 407 a circular air-gap of small but constant width. On the shaft 406 and inside the body 407, there is mounted an energizing winding 408.

A moving coil, the former of which 409 is of insulating material and provided with an internal cheek, is secured at its centre by means of two flanges 410 and 411 to the upper extremity of the moving portion 62 of the filling device. A winding 412 of closely wound turns, is provided at the periphery of the said former. Inside the hollow shaft 406 is applied a lining of non magnetic metal 413 in which slides a rod or plunger 414. At the lower end of this plunger is mounted the tongue 65 which moves in the channel 64 of the moving portion, and the upper extremity of the plunger is connected by means of the slider 78 moving in the fixed vertical guide-way 415 to the connecting rod 13 of the tongue. Externally of the lining 413, the plunger 414 is guided in a fixed slide 415a.

The metal inserts are obtained by cutting off a suitable strip of metal by means of an electro-dynamic control mechanism as shown in Fig. 11. This mechanism comprises the punch 110, the cutting tool 111 engaging into the recessed portion 74 of the filler 62 and an advancing device for the metal strip which travels horizontally in the direction of the arrow f in this figure, and penetrates tool 111 as described below under the action of electrodynamic members 428 and 429.

The punch 110 (Figs. 9 and 11) is fixed to the end of a push-rod 113a moving in a guide 114a mounted beneath the cross-bar 401 carrying the electro-dynamic device 405. The push-rod 113a is provided with two transverse pins 416 (Fig. 9) which are adapted to slide between the prongs of a fork 417 provided at the extremity of a lever 418 pivotally mounted about a fixed shaft 419. At its opposite end, the lever 418 is pivotally secured by means of an elongated slot (not shown) and a shaft 420 to a clevis 421 carried by a rod 421a. The latter is integral with a coil 422 adapted to move in the annular air-gap of an electro-dynamic device 423, which is similar to the device 405 which has been described with reference to Fig. 9. The coil 422 moves axially along the axis of this device, the latter being energized by a winding 424.

With a view to retain the cut metal insert by the punch in the channel 64 of the moving portion and, in order to prevent it from falling while it is not being pushed downwards by the tongue 65, there has been provided on the moving portion 62, and on the side opposite to the punch, a boss 425 in which is mounted a small plunger 426 loaded by a spring 427 (see Fig. 10). When the moving portion 62 of the filling device is at its upper position, this plunger 426 is aligned with the punch 110 and the insert strip is thus pressed between the punch and the piston 426.

The feeding arrangement for the continuous metal strip 452 from which the metal inserts are formed, comprises two alternately acting jaws, one of which is fixed and is directly operated by the punch, while the other is movable and is actuated by two electro-dynamic members 428—429 similar to these previously referred to and each comprising a moving coil 455 or 454 adapted to move in an annular magnetic field. The fixed jaws (Fig. 11) comprise a jaw 430 guided in a suitable slide on the frame and passing into the wall of the guide 431 of the strip of metal so as to clamp this strip against the opposite wall. This jaw 430 is secured at one end of a compression coil spring 430a, the opposite end of which abuts a lug 432 solid with the pushrod 113a of the punch. The length of the spring and the travel of the push-rod are such that the channel for the passage of the metal insert strip in the guide 431 is left completely free by the jaw 430 when the push-rod 113a is in its lefthand position, as shown in Fig. 11.

The moving jaws comprise a cheek 433 sliding in a suitable guide fixed to the frame of the machine and a jaw 434 driven by the cheek 433 in its sliding movement, but urged by springs 435 into a position clearing the channel 453 for the strip of metal 452 in the cheek 433. A push-rod 436, rigidly coupled to the moving coil of the electro-dynamic operating device 429, is adapted to act against the pressure of these springs 435 and abuts on the free extremity of the jaw 434. The extremity of the cheek 433, which is the farthest from the punch, is secured by any suitable means to a hollow rod 437, the other extremity of which carries the moving coil 455 of the electro-dynamic operating device 428, the arrangement being such that the strip of metal 452 passing through the hollow rod 437, after leaving this rod passes into the channel 453 provided in the cheek 433, then into the guide 431 and, after having passed in front of the fixed jaws, enters the cutting tool 111 which is mounted opposite the punch 110 on one side of the moving portion of the filling device.

Due to the rapid response of the electro-dynamic operating devices provided with moving coils of the type described, and due to the possibility of varying at will the moment of their operation, as will be described below, these devices leave a relatively long time for introducing the layer of fibres into the filler 62, cutting a tuft to length and forming and introducing a strip into the passage 64 of the filling device.

*General operation of the machine*

A drum of filling material 8 is placed in position on the machine, the layer of fibres 11 is passed over the tensioning roller 18, and the layer is then rolled round the feeding drum 5, over which it should form one round turn, and it is then engaged in the feeding channel 22 and in the moving jaws 24 of the cutting device in the feed head. When this has been done, the layer 11 is suitably stretched by rotating the drum 8 in the appropriate direction and the drum is then coupled to its driving motor 9. A bobbin of metal is then placed in position and the end of the strip is unrolled and is then passed through the hollow stem 437 into the cheek 433 of the movable jaw, to pass it through the guide 431 into the cutting tool 111. After the shaft of the machine has effected one or two revolutions in an unloaded condition, so as to ensure the correct positioning of the strip of metal and of the layer 11 of filling material, and after tension has been applied thereto, the unfilled brush-heads, which should normally be contained in the work-carrier 16, are placed in position in this work-carrier and the machine may then be started in its normal operating conditions, after the first hole of the first brush head has been brought into the axis of the filling device.

The energizing coils 408 and the like, of the various electro-dynamic operating devices 405, 423, 428 and 429, are constantly supplied from a D.C. source during the whole operating period of the machine. There is passed through the moving coil 412 a control current which has a direction such as to maintain this coil and the moving portion 62 of the filling device in their retracted position, as shown in Fig. 9, in which the upper flange 410 abuts the hollow shaft which forms the core 406 of the electro-dynamic device 405. In this position, the fibres of the hank, coming from the feeding channel 22 are fed laterally by the feed head into the hole 71 of the moving portion as described hereinunder.

As soon as the machine is started, the first hole of the head to be filled being placed in the axis of the filling device, the device which controls the position of the feed head as a function of the length of the tufts actuates the motor 14, and this motor 14 moves the feed head so as to bring it into the correct position in which the cutting knife 37 is placed at a distance from the axis of the filling device, which is equal to half the length of a hank.

At the moment when the control electronic device causes the operation of the feed drum 5 by means of the motors 26 and 27, the jaws 23 and 24 open and since the hole 71, provided in the moving portion of the filling device 62, is at this time coaxial with the feeding channel 22 having the jaws in alignment therewith, the filling material is thus able to pass into this hole to be supported on each side by one of the jaws 23 and 24. The motors 26 and 27 rotate the disc 30 provided with holes and located between the activating lamp 32 and the photo-electric cell 31. The impulses thus produced, are applied to the control electronic device, which stops the motors 26 and 27 as soon as the length of filling material corresponding to the length of the hank to be inserted, has been unrolled. Soon afterwards the cams 51 and 52 allow the jaws 23 and 24 to close again under the action of the springs 57, whereupon the rotating knife acts immediately to cut the hank.

At the beginning of this stage during which the moving part 62 of the filler is in its retracted position, the tongue actuated by the connecting rod 13 is also in its retracted position, the punch 110 is in its left-hand position (in Fig. 11), the moving coil 422 being energized by a suitable control current, the fixed jaws are thus open, whilst the electro-dynamic device 429 keeps the moving jaws in a closed position, the latter being fixed to the electro-dynamic device 428 and being stationary in its fathermost position from the tool 110. As soon as the tongue 65 has begun its downward movement, the direction of the current in the coil 422 is reversed, thus displacing the punch 110 and the jaw 430 of the fixed jaws towards the right (as seen in Fig. 11). Under the action of the spring 430a, the fixed jaws grip progressively the strip of metal in its guide 431 so as to hold it firmly in the cutting tool 111, and at the end of its travel, the punch 110 cuts a metal insert strip which passes laterally into the filling device through the hole 75 and is held in the channel 64 between the punch and the small plunger 426 (Fig. 14). Shortly afterwards, the downwardly moving tongue engages the insert strip and pushes it towards the bottom of the moving portion, which is still in its retracted position, and as soon as the contact has been established, the current is reversed in the moving coil 422, the punch moves backwards (Fig. 15) and the fixed jaws are opened. Shortly afterwards, the direction of the current passing through the coil 412 of the electro-dynamic device 405 actuating the moving portion 62 of the filling device, is reversed, the filling device moves towards its operating position with the fibres of the hank (Fig. 16) and its nose comes into contact with the brush head 15 while the metal insert, pushed down by the tongue, places the tuft in position in the brush head (Fig. 17). In this operating position, the flange 411 of the coil former 409 abuts the intermediate piece 404 securing the member 405 to the cross-bar 401 of the frame. Before the tongue has reached its lower dead-center, the current is reversed once more in the coil 412, and the moving portion of the filling device moves upwards to its retracted position (Fig. 18) then the tongue 65, having pushed the tuft 182 to the bottom of the hole in the brush head, returns to its retracted position (Fig. 19).

The feeding of the metal strip is carried out as the fixed jaws are opened (the punch being then in its position on the left-hand side, as in Fig. 9). To this end, the current is reversed in the moving coil of the electro-dynamic device 428, so that the strip of metal advancing in the direction $f$, and gripped in the moving jaws by the push-rod 436, moves forward by a distance corresponding to one length of metal insert strip, which is regulated by the travel of the coil of the member 428. As soon as the electro-dynamic device 423 has come into action to close the fixed jaws and cut an insert strip, the current is reversed in the electro-dynamic device 429, and this opens the moving jaws by the action of the spring 435 which returns the jaw 434 against the push-rod 436 which has then been withdrawn; the current is then once more reversed in the coil of the device 428, causing the open moving jaws to recede, the strip of metal being retained at this moment by the fixed jaws which are closed. Finally, the current is again reversed in the electro-dynamic device 429 which closes the moving jaws by way of the push-rod 36, and grips the strip of metal in readiness for its next forward movement.

During the period following the insertion of a hank, and before an impulse S has been produced to cause the motors 26 and 27 to start, that is to say for an angle of rotation of the main shaft comprised between about 250° and 320°, the cams controlling the displacement of the trolleys 2 and 3 bring the second hole of the head to be filled into the axis of the filling device. The cycle which has just been described is then repeated.

*Feed of moving coils*

It is, of course, possible to supply the moving coils of the various electro-dynamic devices with direct current and to reverse the direction of flow of the current in these coils by any known means; it is, however, advantageous to use the arrangement shown in diagrammatic form in Fig. 12, which enables the moments at which the various devices are actuated to be readily modified. This arrangement is electronically controlled by an optical channel from the main shaft 161 of the machine. For each electro-dynamic device to be actuated, there is keyed to this shaft 161, or on a shaft turning in synchronism at the same speed therewith, a disc 200a having two holes 201a rotating between a photo-electric cell 202a and an activating lamp 203a. There are thus obtained on the anode of the cell 202a two impulses for each revolution, and these impulses are used to reverse the direction of flow of the current in the moving coil, while the phase may be varied at will by altering the locking position of the disc 200a on the shaft 161 and the angular spacing between the two holes 201a. These two impulses are amplified and applied to electronic circuits shown in Fig. 13.

The impulses produced by the photo-electric cell 202a (Fig. 12) are first of all amplified in a cell-amplifier 204a connected to an electronic flip-flop circuit 205a, the condition of which is changed by every impulse applied thereon. This flip-flop device operates, at every change of its condition, a differential amplifier 207a and a reversible control arrangement 208a supplied from a three-phase network and comprising gas-filled tubes supplying, depending on the condition of the flip-flop device, either a direct current $I_1$ which passes through the moving coil 412 in one direction, or a direct current $I_2$ passing through the moving coil in the opposite direction.

The impulses supplied by the disc 200a keyed on the main shaft 161 after amplification in the conventional cell-amplifier 204a are applied through conductor 218 (Fig. 13) in the form of impulses $S_1$ to the cathode 220a of the double diode 220 constituting the injection diodes of the symmetrical flip-flop device comprising the two triodes 221 and 222.

It is known that a device of this kind has two stable conditions, each triode 221 or 222 being operative when the other is to cut-off and conversely, the change of condition or flip-flop being caused by the simultaneous injection of a negative impulse on the two plates of the two triodes. The plate of the triode 221 is connected to the grid of a buffer tube 223 so that, after an impulse $S_1$ has been received, coming from the amplifier 204a, the potential of the plate of the triode 221 which is applied to the control grid of the tube 223 varies whereby the point A, which is simultaneously connected through the coupling resistance 250 to the anode of tube 223 and through resistance 249 to the negative terminal of the H.T. source, is carried to a potential which is alternatively brought from a positive to a negative value and vice-versa each time a pulse $S_1$ is applied to the cathodes of tube 220.

The potential at the point A, forming the input terminal of the differential amplifier 207a is applied to the grid 251a of the double triode 251 having coupled cathodes, through the resistance 252. The grid 251b of this double triode is connected to ground through lead 450. In each of the anode circuits of this double triode are mounted respectively two potentiometers 253 and 254 from which are derived the control potentials actuating the two thyratrons 255 and 256 connected in phase opposition and supplying a moving coil such as coil 412.

The conductor 257 connected to the anode of the thyratron 255 is connected to the phase 1 of a three-phase network having a frequency of 400 cycles per second, whilst the conductor 258, joined to the cathode of the thyratron 256 is connected to the phase 2 of the same network. The potential applied to the grid of the thyratron 255 of the control channel I supplying the coil 412 in the direction of the arrow $I_1$, is obtained through the transformer 259 from a triode tube 260, the grid of which is fed with a sine potential in phase quadrature with the potential of the phase I. This last potential is derived from the secondary winding of the transformer 261, the primary of which is connected between the phases 2 and 3 of the three-phase network at 400 cycles/sec. The continuous potential obtained from the potentiometer 253 is superposed through the secondary of the transformer 261 on the sine potential at 400 cycles and thus supplies the variable element enabling the thyratron 255 of the control channel I, to be energized. A fixed biasing potential is applied to the grid of each thyratron in the usual manner. Said potential is derived for the thyratron 255 from the secondary winding 451 of a biasing transformer whose extremities are connected in parallel through a pair of rectifiers of any type to the secondary winding of the transformer 259, the middle tap of the secondary winding 451 being connected to the cathode of the thyratron 255. As known, the primary 451a of the biasing transformer may be connected to any A.C. source.

The channel II, by means of which the coil 412 is supplied in the direction of the arrow $I_2$ from the phase 2, comprises circuits similar to those which have just been described and which have been shown diagrammatically as a rectangle 262 to avoid unnecessary complication in Fig. 13. Said circuits are connected to the cathode of thyratron 256, which is also directly connected to the phase 2 of the 400 cycles per second network, and the anode of said thyratron is connected to coil 412. The ignition of said thyratron is governed by the potential appearing on the tap of the potentiometer 254 connected to the channel II by the conductor 263.

The facility with which it is possible, due to the electro-dynamic control devices which have been described, to modify the time at which the movable part of the filler 62 is being brought from its retracted position to its operating position for the insertion of the tuft, and the great rapidity of displacement thereof, leave a relatively long period for the insertion of the layer of fibres 11 into the filler, for severing a hank therefrom, and for cutting and introducing a strip insert therein. In the machine of my invention, it is possible by a mere adjustment of the keying of the disc 200a controlling the movements of the moving part 62, to cause the nose of the filler to move away, i.e. to release the filling material just before the tuft is completely inserted into the hole of the brush head by means of the strip insert.

When a fixed work-carrier is used this enables the tuft to be well driven into its housing by means of a positive drive and to ensure a complete transfer of the metal insert from the extremity of the nose of the filling device to the hole, which is not frequently the case, especially with brush-heads of hard material, when use is made of movable work-carriers which move with the tongue at the end of the filling stage and which, for this reason, are subject to bouncing effects due to the springs included therein.

It will be seen that the machine which has just been described, enables the hanks to be formed as and when they are required, by virtue of the direct use of a continuous layer of fibres, and especially becaue said hanks are cut at the precise length required, allows a substantial economy of filling material to be effected. The machine also eliminates the operation of profiling the brushing surface. The electronic and electro-dynamic controls of the moving parts enable the response time of these parts to be considerably reduced and, in consequence, the speed of operation to be increased to a sizable extent, this speed readily reaching 1,000 hanks per minute.

It will, of course be understood that modifications may be made to the specific embodiment of the brush-filling machine which has just been described. Thus it is possible to use for the drive of the moving portion of the filling device, an electronically controlled-pulse initiated-electro-magnetic device other than that which has been described, provided that this other device gives the said moving portion a stationary period of sufficient length at its upper dead-center or retracted position, so as to enable the hank and the insert strip to be passed into the moving portion from devices fixed to the frame of the machine. In the same way, although it has been assumed that the layer 11 of filling material, had been wound one dead turn round the feeding drum 5 before passing into the feeding channel 22, it is not bared to increase the total angle of winding so as to reduce any possible slip between this drum and the filling material. To this end, a device may be used, in which the layer 11, after leaving the roller 18 of the tensioning device, passes into a first groove of the drum 5, then is led back to be wound round a second drum directing it into a second groove of the drum 5, while following a direction roughly parallel to that followed at its first entry, and is wound one complete turn round this drum 5 before passing into the channel 22.

What I claim is:

1. In a rapid response device permitting an easy adjustment of the operating time for moving an operating member in a to and fro motion; the combination comprising a bell shaped magnet provided with a hollow core coaxially disposed in said bell magnet and terminating in a pole piece forming with the internal wall of the said bell magnet an annular air-gap, a cylindrical moving coil arranged in said air-gap to move coaxially therein; stopping devices adapted for locating said moving coil in an innermost and an outermost position respectively with respect to said bell magnet; an operating member, means mechanically connecting said moving coil with said operating member; guiding means for guiding said operating member along the common axis of said bell magnet and said coil; means for emitting an electrical impulse each time said operating member is to be displaced; a three-phase current source; a pair of gas-filled rectifier tubes supplied from two different phases of said three phase current source and having their outputs connected in parallel to said moving coil and arranged to feed said coil with direct current of reverse polarities; and electronic means operated by said electrical impulses for simultaneously applying to the control grids of said rectifier tubes a potential igniting the first one of said rectifier tubes and putting the second tube of said pair of tubes to cut-off, or conversely igniting the second tube of said pair of tubes and putting the first one to cut-off, whereby said moving coil is permanently traversed by a direct current whose polarity is reversed at each impulse and is rapidly moved, with the operating member connected therewith, from its innermost position to its outermost position and from its outermost position to its innermost position.

2. In a rapid response device permitting an easy adjustment of the operating time for moving at a quick rate an operating member in a to and fro motion; the combination comprising a bell shaped magnet provided with a hollow core coaxially disposed in said bell magnet and terminating in a pole piece forming with the internal wall of said bell magnet an annular air-gap; a cylindrical moving coil arranged in said air-gap for movement coaxially therein; stopping devices adapted for locating said moving coil in an innermost and an outermost position respectively with respect to said bell magnet; an operating member, means mechanically connecting said moving coil with said operating member; guiding means for guiding said operating member along the common axis of said bell magnet and said coil; a photo-electric cell; means for directing on said cell a light pulse each time said operating member is to be displaced; a cell amplifier connected to said photo electric cell for amplifying the electric signal provided by said cell under the action of said light pulse; a symmetrical flip-flop device connected to the output of said amplifier; a buffer triode whose grid is connected to one of the anodes of said flip-flop device; an hybrid amplifier comprising a double-triode whose cathodes are coupled together and having in its anode circuits a pair of potentiometers; coupling means for connecting one grid of said double triode to the anode of said buffer triode and for connecting the other grid of said double triode to ground; a three-phase current source; a pair of gas-filled rectifier tubes supplied from two different phases of said three-phase source and having their outputs connected in parallel to said moving coil and arranged to feed said coil with direct current of reverse polarities; and a pair of operating circuits each connected respectively, on the one hand, to the sliding contacts of said potentiometers and, on the other hand, to the control grids of the rectifier tubes, whereby the potentials derived from said potentiometers simultaneously ignite one of said rectifier tubes and put the other to cut-off, thereby reversing the direction of passage of the direct current through said coil and selectively displacing it from its innermost to its outermost position and from its outermost position to its innermost position.

3. The combination of claim 2 wherein each operating circuit connecting one sliding contact of said potentiometers to the control grid of a gas-filled rectifier tube comprises, a transformer whose primary winding is connected between the two phases of said three-phase current source different from the phase feeding said rectifier tube operated through said circuit; a triode whose grid is connected through the secondary winding of said transformer to said sliding contact; a coupling transformer adapted for applying the output signal of said triode to the control grid of said rectifier tube, and means for further biasing said control grid to a negative potential.

4. A machine for mounting brushes by using metal inserts severed from a metal strip for securing the tufts of bristles in a brush mounting comprising: a vertical filling device provided with a longitudinal channel and a transverse passage extending from said channel and opening at its other extremity to one lateral side of said filling device and adapted to assume a high position in which a metal insert is severed from said strip and pushed in said longitudinal channel through said transverse passage, and a low position where said metal insert is engaged in a brush mounting for securing a tuft in place; a punching tool secured to said machine and having a punch disposed coaxially to said transverse passage when said filling device is in its high position; guiding means for guiding said metal strip to said punching tool; a mechanism for operating said punch and comprising a lever pivoted intermediate its extremities and coupled at one of said extremities to said punch; a first electro-dynamic device having a moving coil therein; a rod secured to said moving coil and arranged for longitudinally sliding coaxially with said moving coil; means pivotally securing said rod to the second extremity of said lever; a fixed clamp and a moving clamp for feeding said strip to said punching tool and maintaining said strip to rest in said tool, said fixed clamp being constituted by a jaw coupled through spring means to the punch of said tool, said jaw sliding in a lateral opening of said guiding means and cooperating with the opposite inner wall of said guiding means, said moving clamp comprising a body portion having a longitudinal passage arranged throughout and adapted for guiding said metal strip on a part of its travel to said punching tool and a jaw mounted in said body portion at right angles to the inner wall of said longitudinal passage in said body portion and cooperating with the opposite inner wall of said last named passage; a second electro-dynamic device having a second moving coil therein; a push rod secured to said second moving coil and abutting the jaw of said moving clamp for operating the latter; a third electro-dynamic device having a third moving coil therein secured to a hollow rod sliding through the core of said third electro-dynamic device, said hollow rod having therethrough a longitudinal passage for said metal strip and being secured by one of its extremities to the body portion of said moving clamp with its passage in register with the passage of said body portion; each of said electro-dynamic devices comprising a bell-shaped magnet having an axial core coaxially disposed in said bell magnet and forming a guide for the rod secured to said moving coil and terminating outwardly in a pole piece forming with the internal wall of said bell an annular air-gap in which is coaxially disposed said moving coil for to and fro movement therein; said moving coils being each permanently traversed by an electrical direct current maintaining said coils according to the polarity of said electrical current either in an innermost position or in an outermost position; a three-phase current source; and a holed disc and photocell arrangement for emitting at each turn of rotation of the main shaft of the machine a pair of electrical impulses for operating each electro-dynamic device; a pair of gas-filled rectifier tubes supplied from two different phases of said three-phase current source and having their outputs connected in parallel to the corresponding moving coil and arranged to feed said coil with direct current of reverse polarities; and electronic means operated by said electrical impulses for simultaneously applying to the control grids of said rectifier tubes a potential igniting the first one of said rectifier tubes and putting the second tube of said pair of tubes to cut-off or conversely igniting the second tube of said pair of tubes and putting the first one to cut-off, whereby the direct current traversing each moving coil is reversed each time a hole of the associated disc passes in register with its associated photocell and said coil is rapidly and selectively moved from its innermost position to its outermost position and from its outermost position to its innermost position for operating the rod associated therewith.

5. A machine operating at a quick rate for mounting brushes with tufts of fibres severed from a continuous layer of fibres comprising: a vertical filling device provided with a longitudinal channel and having a first transverse passage transversely communicating with said channel for receiving the continuous layer of fibres from which a hank is to be severed and a second passage, above said first passage, extending from said channel and opening at its other extremity to one lateral side of said filling device; a bell-shaped magnet vertically mounted above and coaxial with said filling device, said magnet being provided with a hollow core coaxially disposed in said bell magnet and terminating in a pole piece forming an annular air-gap with the internal wall of said bell magnet; a cylindrical moving coil arranged in said air-gap for moving coaxially therein; stopping devices adapted for locating said moving coil in an innermost and an outermost position respectively with respect to said magnet; means mechanically connecting said moving coil with said filling device; guiding means for guiding said filling device along the common axis of said bell magnet and said coil; a non magnetic lining secured in the bore of said hollow core; a plunger sliding in said lining, a filling tongue carried by said plunger and reciprocated in said longitudinal channel of said filling device; a main driving shaft for the machine, means for mechanically reciprocating said plunger along the common axis of said moving coil and filling device once for each turn of rotation of the main driving shaft of the machine; means for introducing in said first transverse passage a length of said layer of continuous fibres and severing a hank from said layer; means for introducing through said second passage in said longitudinal channel above said hank a metal insert severed from a metal strip; a shaft connected to the main driving shaft of the machine for rotating therewith at the same revolution rate; a disc of opaque material keyed on said shaft and having a pair of holes drilled therethrough and located on a common circle coaxial with said shaft; an electric photo-cell located on one side of said disc in front of said circle; an activating lamp for said cell located on the other side of said disc in front of said cell for causing said cell to emit an electrical impulse twice for each turn of rotation of said main shaft of the machine; a three phase current source; a pair of gas filled rectifier tubes supplied from two different phases of said three phase current source and having their outputs connected in parallel to said moving coil and arranged to feed said coil with direct current of reverse polarities; and the electronic means operated by said electrical impulses for simultaneously applying to the control grids of said rectifier tubes a potential selectively igniting one of said rectifier tubes and putting the other to cut-off, whereby said moving coil is permanently traversed by a direct current whose polarity is reversed at each impulse and is rapidly moved from its innermost to its outermost position displacing therewith said filling device with a hank of fibres engaged therein for insertion in the brush mounting under the action of the filling tongue pushing said metal insert, and from its outermost to its innermost position for driving back said filling device in the position where it is fed with a new hank.

6. A machine for making brushes from continuous lengths of fibers and for mounting brushes with tufts severed from said continuous lengths of fibers comprising: a filling device adapted to overlie a brush-head and having a vertical channel and a first transverse passage transversely communicating with the channel for receiving the continuous length of fibers from which a hank is to be severed; said filling device also having a second transverse passage disposed above said first passage and extending from said channel and adapted to receive a metal insert to be fitted in a hole in brush-head along with a severed hank, a bell shaped magnet vertically mounted above the filling device and provided with a hollow core coaxially disposed within the bell magnet, said core terminating in a pole piece forming an annular air-gap with the internal wall of the bell magnet, a cylindrical moving coil arranged in the air-gap for moving axially therein, stopping means disposed in spaced relationship at opposite points of the path of movement of said moving coil for locating said coil in an innermost and an outermost position with respect to said bell magnet; means connecting said coil with said filling device; means for guiding said filling device along the common axis of the bell magnet and the coil; a non-magnetic lining within said core, a plunger sliding in said lining member; a filling tongue depending from and carried by said plunger, a main driving shaft, means connecting said main driving shaft to said plunger for reciprocating it once for each turn of rotation of the main driving shaft; means for introducing a length of continuous fibres into the first transverse passage, means for severing a hank therefrom; means for introducing into the channel through the second passage a metal insert severed from a continuous strip, an opaque disc rotatively operated by said main driving shaft and having a pair of apertures formed therethrough opening to the opposing faces and located on a common circle concentric therewith; an electric photo-cell disposed on one side of said disc, an activating lamp disposed on the other side of said disc in front of said cell for causing said cell to emit an electrical impulse twice for each revolution of said main driving shaft, a three-phase current source, a pair of gas-filled rectifier tubes supplied from two different phases of said three phase current source and having their outputs connected in parallel to said moving coil and arranged to feed said coil with direct current of reverse polarities; and electronic means operated by said electrical impulses for simultaneously applying to the control grids of said rectifier tubes a potential selectively igniting one of said rectifier tubes and putting the other to cut-off, whereby said moving coil is permanently traversed by a direct current whose polarity is reversed at each impulse and is rapidly moved from its innermost to its outermost position displacing therewith said filling device with a hank of fibres engaged therein for insertion in the brush-head under the action of the filling tongue pushing said metal insert, and from its outermost to its innermost position for driving back said filling device in the position where it is fed with a new hank.

References Cited in the file of this patent

UNITED STATES PATENTS

| | | |
|---|---|---|
| 85,193 | White | Dec. 22, 1868 |
| 1,001,550 | Murdock | Aug. 22, 1911 |
| 1,891,236 | Marogg | Dec. 20, 1932 |
| 2,317,401 | Hall | Apr. 27, 1943 |
| 2,455,759 | Gregory | Dec. 7, 1948 |